United States Patent
Brosnan et al.

(10) Patent No.: US 8,454,440 B2
(45) Date of Patent: Jun. 4, 2013

(54) OPEN ARCHITECTURE COMMUNICATIONS IN A GAMING NETWORK

(75) Inventors: William R. Brosnan, Reno, NV (US);
Steven G. LeMay, Reno, NV (US);
Warner Cockerille, Sparks, NV (US);
Dwayne Nelson, Las Vegas, NV (US);
Robert Breckner, Sparks, NV (US)

(73) Assignee: IGT, Reno, NV (US)

( * ) Notice: Subject to any disclaimer, the term of this patent is extended or adjusted under 35 U.S.C. 154(b) by 1095 days.

(21) Appl. No.: 12/283,382

(22) Filed: Sep. 10, 2008

(65) Prior Publication Data

US 2009/0069094 A1  Mar. 12, 2009

Related U.S. Application Data

(60) Division of application No. 10/716,319, filed on Nov. 17, 2003, now Pat. No. 7,438,643, which is a division of application No. 10/184,451, filed on Jun. 26, 2002, now Pat. No. 6,682,423, which is a continuation-in-part of application No. 09/838,033, filed on Apr. 19, 2001, now Pat. No. 6,722,985.

(51) Int. Cl.
*A63F 13/00*  (2006.01)

(52) U.S. Cl.
USPC ........... 463/42; 463/16; 463/17; 463/18; 463/20; 463/25; 463/29; 463/40; 463/41; 463/43; 710/104; 710/105; 710/110; 710/314; 710/315

(58) Field of Classification Search
USPC ...... 463/16–20, 25, 39–43, 29; 710/100–103, 710/104, 105, 110, 314, 315
See application file for complete search history.

(56) References Cited

U.S. PATENT DOCUMENTS

| | | | |
|---|---|---|---|
| 4,301,505 A | 11/1981 | Catiller et al. |
| 4,572,509 A | 2/1986 | Sitrick |
| 4,652,998 A | 3/1987 | Koza et al. |
| 4,856,787 A | 8/1989 | Itkis |
| 5,367,644 A | 11/1994 | Yokoyama et al. |

(Continued)

FOREIGN PATENT DOCUMENTS

| | | |
|---|---|---|
| CA | 2241650 | 1/1999 |
| CA | 2319600 | 3/2001 |

(Continued)

OTHER PUBLICATIONS

Judgment dated Oct. 22, 2009 issued in *IGT v. Alliance Gaming Corporation et al.*, . United States Court of Appeals (Federal Circuit), No. 2009-1110, 2 pages.

(Continued)

*Primary Examiner* — Sunit Pandya
(74) *Attorney, Agent, or Firm* — Foley & Lardner LLP

(57) ABSTRACT

Open architecture communication systems and methods are provided that allow flexible data transmission between gaming machines and other devices and nodes within a gaming machine network. The gaming machine and other devices employ a communication interface that sends and receives data via a common communication protocol and via common communication hardware. The communication interface and common communication protocol allow data transfer between gaming machines and other network nodes such as gaming service servers, despite the presence of different proprietary gaming machine functions and proprietary communication protocols and despite the presence of various proprietary hardware and proprietary communication protocols relied on by the servers.

20 Claims, 6 Drawing Sheets

U.S. PATENT DOCUMENTS

| | | | |
|---|---|---|---|
| 5,379,382 | A | 1/1995 | Work et al. |
| 5,429,361 | A | 7/1995 | Raven et al. |
| 5,465,082 | A | 11/1995 | Chaco |
| 5,559,794 | A | 9/1996 | Willis et al. |
| 5,586,937 | A | 12/1996 | Menashe |
| 5,611,730 | A | 3/1997 | Weiss |
| 5,643,086 | A | 7/1997 | Alcorn et al. |
| 5,655,961 | A | 8/1997 | Acres et al. |
| 5,702,304 | A | 12/1997 | Acres et al. |
| 5,708,838 | A | 1/1998 | Robinson |
| 5,721,958 | A | 2/1998 | Kikinis |
| 5,741,183 | A | 4/1998 | Acres et al. |
| 5,752,882 | A | 5/1998 | Acres et al. |
| 5,759,102 | A | 6/1998 | Pease et al. |
| 5,761,647 | A | 6/1998 | Boushy |
| 5,762,552 | A | 6/1998 | Vuong et al. |
| 5,770,533 | A | 6/1998 | Franchi |
| 5,790,806 | A | 8/1998 | Koperda |
| 5,797,085 | A | 8/1998 | Beuk et al. |
| 5,820,459 | A | 10/1998 | Acres et al. |
| 5,833,540 | A | 11/1998 | Miodunski et al. |
| 5,836,817 | A | 11/1998 | Acres et al. |
| 5,845,283 | A | 12/1998 | Williams et al. |
| 5,851,149 | A | 12/1998 | Xidos et al. |
| 5,876,284 | A | 3/1999 | Acres et al. |
| 5,902,983 | A | 5/1999 | Crevelt et al. |
| 5,918,039 | A | 6/1999 | Buswell et al. |
| 5,958,020 | A | 9/1999 | Evoy et al. |
| 5,971,271 | A | 10/1999 | Wynn et al. |
| 5,974,409 | A | 10/1999 | Sanu et al. |
| 5,978,920 | A | 11/1999 | Lee |
| 5,991,760 | A | 11/1999 | Gauvin et al. |
| 5,999,808 | A | 12/1999 | LaDue |
| 6,001,016 | A | 12/1999 | Walker et al. |
| 6,003,013 | A | 12/1999 | Boushy et al. |
| 6,003,094 | A | 12/1999 | Dean |
| 6,034,963 | A | 3/2000 | Minami et al. |
| 6,035,327 | A | 3/2000 | Buckley et al. |
| 6,039,648 | A | 3/2000 | Guinn et al. |
| 6,071,190 | A | 6/2000 | Weiss et al. |
| 6,085,247 | A | 7/2000 | Parsons, Jr. et al. |
| 6,088,802 | A | 7/2000 | Bialick et al. |
| 6,104,815 | A | 8/2000 | Alcorn et al. |
| 6,106,396 | A | 8/2000 | Alcorn et al. |
| 6,110,041 | A | 8/2000 | Walker et al. |
| 6,117,010 | A | 9/2000 | Canterbury et al. |
| 6,135,884 | A | 10/2000 | Hedrick et al. |
| 6,135,887 | A | 10/2000 | Pease et al. |
| 6,141,737 | A | 10/2000 | Krantz et al. |
| 6,149,522 | A | 11/2000 | Alcorn et al. |
| 6,162,122 | A | 12/2000 | Acres et al. |
| 6,178,510 | B1 | 1/2001 | O'Connor et al. |
| 6,183,362 | B1 | 2/2001 | Boushy |
| 6,216,188 | B1* | 4/2001 | Endo et al. .................. 710/302 |
| 6,233,610 | B1 | 5/2001 | Hayball et al. |
| 6,251,014 | B1 | 6/2001 | Stockdale et al. |
| 6,270,410 | B1 | 8/2001 | DeMar et al. |
| 6,285,868 | B1 | 9/2001 | LaDue |
| 6,319,125 | B1 | 11/2001 | Acres |
| 6,368,216 | B1 | 4/2002 | Hedrick et al. |
| 6,375,567 | B1 | 4/2002 | Acres |
| 6,394,900 | B1 | 5/2002 | McGlone et al. |
| 6,394,907 | B1 | 5/2002 | Rowe |
| 6,409,602 | B1 | 6/2002 | Wiltshire et al. |
| 6,430,164 | B1 | 8/2002 | Jones et al. |
| 6,511,377 | B1 | 1/2003 | Weiss |
| 6,565,434 | B1 | 5/2003 | Acres |
| 6,638,170 | B1 | 10/2003 | Crumby |
| 6,645,077 | B2 | 11/2003 | Rowe |
| 6,682,423 | B2 | 1/2004 | Brosnan et al. |
| 6,712,698 | B2 | 3/2004 | Paulsen et al. |
| 6,722,985 | B2 | 4/2004 | Criss-Puszkiewicz et al. |
| 6,875,110 | B1 | 4/2005 | Crumby |
| 6,908,387 | B2 | 6/2005 | Hedrick et al. |
| 7,438,643 | B2 | 10/2008 | Brosnan et al. |
| 8,162,755 | B2 | 4/2012 | Brosnan et al. |
| 2001/0044339 | A1* | 11/2001 | Cordero et al. .................. 463/42 |
| 2001/0049303 | A1 | 12/2001 | Found et al. |
| 2001/0053712 | A1 | 12/2001 | Yoseloff et al. |
| 2002/0002075 | A1 | 1/2002 | Rowe |
| 2002/0019891 | A1 | 2/2002 | Morrow et al. |
| 2002/0034980 | A1 | 3/2002 | Lemmons et al. |
| 2002/0035621 | A1 | 3/2002 | Zintyel et al. |
| 2002/0039921 | A1 | 4/2002 | Rowe et al. |
| 2002/0052230 | A1 | 5/2002 | Martinek et al. |
| 2002/0059614 | A1 | 5/2002 | Lipsanen et al. |
| 2002/0071557 | A1 | 6/2002 | Nguyen |
| 2002/0077169 | A1 | 6/2002 | Kelly et al. |
| 2002/0077170 | A1 | 6/2002 | Johnson et al. |
| 2002/0077178 | A1 | 6/2002 | Oberberger et al. |
| 2002/0155887 | A1 | 10/2002 | Criss-Puszkiewicz et al. |
| 2002/0165023 | A1 | 11/2002 | Brosnan et al. |
| 2003/0014483 | A1 | 1/2003 | Stevenson et al. |
| 2003/0100370 | A1 | 5/2003 | Gatto et al. |
| 2003/0100372 | A1 | 5/2003 | Gatto et al. |
| 2003/0172196 | A1 | 9/2003 | Hejlsberg et al. |
| 2003/0228910 | A1 | 12/2003 | Jawaharlal et al. |
| 2004/0048668 | A1 | 3/2004 | Brosnan |
| 2004/0053694 | A1 | 3/2004 | Rowe |
| 2004/0132532 | A1 | 7/2004 | Brosnan et al. |
| 2004/0166931 | A1 | 8/2004 | Criss-Puszkiewicz et al. |
| 2008/0076577 | A1 | 3/2008 | Brosnan et al. |
| 2012/0184354 | A1 | 7/2012 | Brosnan et al. |

FOREIGN PATENT DOCUMENTS

| | | |
|---|---|---|
| GB | 2 161 629 | 1/1986 |
| GB | 2325543 | 11/1998 |
| RU | 2102790 C1 | 1/1998 |
| WO | WO95-30944 | 11/1995 |
| WO | WO98-52664 | 11/1998 |
| WO | WO01-01186 | 3/2000 |
| WO | WO02-09052 | 1/2002 |
| WO | WO02-17251 | 2/2002 |
| WO | WO2004-004280 | 1/2004 |
| WO | WO2004-024260 | 3/2004 |

OTHER PUBLICATIONS

Order (re Motions for Summary Judgment) dated Oct. 16, 2008 issued in *IGT* v. *Alliance Gaming Corporation et al.*, U.S. District Court (Nevada); Case No. 2:04-CV-1676-RCJ-(RJJ), 43 pages.

LeMay, Steven G., Rowe, Richard E., Mike M. Oberberger, "Gaming Machine Virtual Player Tracking and Related Services", U.S. Appl. No. 09/642,192, filed Aug. 18, 2000.

Criss-Puszkiewicz, Cynthia et al., "Universal Player Tracking System," U.S. Appl. No. 09/838,033, filed Apr. 19, 2001.

Hedrick, Joseph and Nguyen, Binh, "Player Tracking Communication Mechanisms in a Gaming Machine," U.S. Appl. No. 09/921,489, filed Aug. 3, 2001; http://www.usb.org/Oct. 23, 2002.

U.S. Office Action dated Mar. 28, 2003 issued in U.S. Appl. No. 10/164,452 (6,682,423).

U.S. Notice of Allowance dated Sep. 4, 2003 issued in U.S. Appl. No. 10/164,452 (6,682,423).

U.S. Office Action dated May 4, 2005 issued in U.S. Appl. No. 10/716,319 (7,438,643).

U.S. Office Action Final dated Apr. 20, 2006 issued in U.S. Appl. No. 10/716,319 (7,438,643).

U.S. Advisory Action dated Jul. 17, 2006 issued in U.S. Appl. No. 10/716,319 (7,438,643).

U.S. Office Action dated Oct. 13, 2006 issued in U.S. Appl. No. 10/716,319 (7,438,643).

U.S. Examiner Interview Summary dated Dec. 8, 2006 issued in U.S. Appl. No. 10/716,319 (7,438,643).

U.S. Office Action Final dated Feb. 23, 2007 issued in U.S. Appl. No. 10/716,319 (7,438,643).

U.S. Advisory Action dated May 8, 2007 issued in U.S. Appl. No. 10/716,319 (7,438,643).

U.S. Notice of Allowance dated Jan. 10, 2008 issued in U.S. Appl. No. 10/716,319 (7,438,643).

U.S. Notice of Allowance dated Jun. 10, 2008 issued in U.S. Appl. No. 10/716,319 (7,438,643).

U.S. Office Action dated May 5, 2005 issued in U.S. Appl. No. 10/243,982.

U.S. Office Action Final dated Oct. 7, 2005 issued in U.S. Appl. No. 10/243,982.
U.S. Advisory Action dated Jan. 25, 2006 issued in U.S. Appl. No. 10/243,982.
U.S. Office Action dated Feb. 23, 2006 issued in U.S. Appl. No. 10/243,982.
U.S. Office Action Final dated Jun. 13, 2006 issued in U.S. Appl. No. 10/243,982.
U.S. Office Action dated Dec. 5, 2006 issued in U.S. Appl. No. 10/243,982.
U.S. Office Action Final dated Jun. 1, 2007 issued in U.S. Appl. No. 10/243,982.
U.S. Advisory Action dated Sep. 4, 2007 issued in U.S. Appl. No. 10/243,982.
U.S. Office Action dated Dec. 21, 2007 issued in U.S. Appl. No. 10/243,982.
U.S. Office Action Final dated Jun. 24, 2008 issued in U.S. Appl. No. 10/243,982.
U.S. Advisory Action dated Aug. 11, 2008 issued in U.S. Appl. No. 10/243,982.
U.S. Office Action dated Jun. 6, 2003 issued in U.S. Appl. No. 09/838,033 (6,722,985).
U.S. Notice of Allowance dated Dec. 1, 2003 issued in U.S. Appl. No. 09/838,033 (6,722,985).
U.S. Office Action dated Apr. 25, 2005 issued in U.S. Appl. No. 10/789,302.
Australian Notice of Opposition dated Nov. 10, 2008 filed by Aristocract Technologies against IGT AU Application No. 2003251586.
Australian Notice of Withdrawal of Opposition dated Aug. 20, 2009 filed by Aristocract Technologies in IGT AU Application No. 2003251586.
Australian Statement of Grounds and Particulars (dated Jan. 23, 2009) in Support of Notice of Opposition filed by Aristocract Technologies against IGT AU Application No. 2003251586.
PCT International Preliminary Examination Report dated Jul. 1, 2005 issued in PCT/U503/019491 (WO2004004280).
PCT International Search Report dated Jan. 10, 2003 issued in PCT/US03/019491 (WO2004004280).
PCT International Search Report dated Jan. 27, 2004 issued in PCT/US03/27540 (WO2004-024260).
Russian Advisory Office Action (#1) dated May 16, 2007 issued in RU2004138545-09.
Russian Advisory Office Action (#2) dated Oct. 20, 2007 issued in RU2004138545-09.
Russian Resolution on Granting Patent dated Jan. 28, 2008 issued in RU2004138545-09.
Bally's Brief In Support of Their Proposed Constructions for the '698 and '985 Patents: *IGT* v. *Alliance Gaming Corp.; Bally Gaming International; and Bally Gaming, Inc.* U.S. District Court of Nevada Case No. CV-S-04-1676-RCJ-(RJJ) (38 pages).
Crumby, Hardly Lee, "Multi-System Gaming Terminal Communication Device", U.S. Appl. No. 09/690,925, filed Oct. 17, 2000.
Declaration of Bart A. Lewin in Support of Plaintiff IGT's Opening Claim Construction Brief Addressing U.S. Patent No. 6,712,698 and U.S. Patent No. 6,722,985 (The "Player Tracking Unit" Patents): *IGT* v. *Alliance Gaming Corporation; Bally Gaming International; and Bally Gaming, Inc.* U.S. District of Nevada Case No. CV-S-04-1676-RCJ-(RJJ) (13 pages).

Declaration of John F. Acres in Support of Defendant's Opening Claim Construction Brief for the '698 and '985 Patents: *IGT* v. *Alliance Gaming, Corp.; Bally Gaming International, Inc.; and Bally Gaming, Inc.* U.S. District of Nevada Case No. CV-S-04-1676-RCJ-(RJJ) (47 pages).
Defendant's Invalidity Contentions in Litigation Proceedings; *IGT* vs. *Bally's*; District of Nevada case No. CV-S-04-1676-RCJ-(RJJ) 194 pgs.
Definition of "socket" from a variety of on-line dictionaries, 7 pages.
Levine et al., The Internet for Dummies, 6th edition, IDG Books, 1999, p. 57.
Members of B-Link Technical Committee, "Summary of Comment Regarding Adoption of Internal Bus Standard for Electronic Gaming Machines," Oct. 26, 1999.
Metcalfe et al. "Programming UNIX Sockets in C—Frequently Asked Questions" Aug. 21, 1996.
Norekov et al., "Telecommunication Technologies and Networks," 1998, Moscow, Publishing House of the Moscow State Technical University, pp. 78-85 (with translation).
Pershikov et al., "Defining Dictionary Informatics," 1995, 2nd Edition, amanded, Moscow Finances and Statistics, 1 pg (with translation).
Plaintiff IGT' s Opening Claim Construction Brief Addressing U.S. Patent No. 6,712,698 and U.S. Patent No. 6,722,985 (The "Player Tracking Unit" Patents) U.S. District Court of Nevada Case No. CV-S-04-1676-RCJ-(RJJ) (34 pages).
Stockdale, James and LeMay, Steven G. "Standard Peripheral Communication", U.S. Appl. No. 09/414,659, filed Oct. 6, 1999.
Stockdale, Jim, Description of the IGT Netplex Associated Interface System, pp. 1-2; System used in public prior to Oct. 6, 1998.
Wang et al., "Casino Technology: Player Tracking and Slot Accounting Systems", Gaming Res. Rev. J. (USA), Gaming Research & Review Journal, Univ. Nevada (Abstract).
U.S. Pre-Brief Appeal Conference Decision dated Aug. 2, 2007 issued in U.S. Appl. No. 10/716,319.
U.S. Office Action dated Jul. 15, 2011 issued in U.S. Appl. No. 11/830,816.
U.S. Notice of Allowance dated Dec. 22, 2011 issued in U.S. Appl. No. 11/830,816.
U.S. Office Action dated Mar. 12, 2004 issued in U.S. Appl. No. 10/243,982.
U.S. Office Action dated Apr. 28, 2004 issued in U.S. Appl. No. 10/243,982.
U.S. Office Action Final dated Nov. 23, 2004 issued in U.S. Appl. No. 10/243,982.
U.S. Office Action dated Jun. 1, 2005 issued in U.S. Appl. No. 10/243,982.
U.S. Office Action Final dated Apr. 6, 2006 issued in U.S. Appl. No. 10/243,982.
Australian Examiner's first report dated Aug. 3, 2007 issued in AU 2003251586.
Australian Examiner's first report dated May 17, 2010 issued in 2008230071.
Canadian Office Action dated Apr. 13, 2011 issued in 2,490,375.
European Office Action dated Nov. 9, 2010 issued in 03761963.2.
U.S. Office Action dated Dec. 11, 2012 issued in U.S. Appl. No. 13/425,187.
European Office Action dated Oct. 11, 2012 issued in 03 761 963.2.

* cited by examiner

OPEN ARCHITECTURE COMMUNICATIONS IN A GAMING NETWORK

CROSS REFERENCE TO RELATED APPLICATIONS

This application is a divisional of and claims priority to copending U.S. patent application Ser. No. 10/716,319 entitled "OPEN ARCHITECTURE COMMUNICATIONS IN A GAMING NETWORK," filed on Nov. 17, 2003 now U.S. Pat. No. 7,438,643, which is a divisional of U.S. patent application Ser. No. 10/184,451 entitled "OPEN ARCHITECTURE COMMUNICATIONS IN A GAMING NETWORK," filed on Jun. 26, 2002 now U.S. Pat. No. 6,682,423, which is a continuation-in-part of U.S. patent application Ser. No. 09/838,033 entitled "UNIVERSAL PLAYER TRACKING SYSTEM," filed on Apr. 19, 2001 now U.S. Pat. No. 6,722,985, all of which are incorporated by reference herein for all purposes.

BACKGROUND OF THE INVENTION

This invention relates to communication systems and methods used with gaming machines such as video slot machines and video poker machines. More particularly, the present invention relates to methods and apparatus for providing open architecture communications systems that may incorporate the use of numerous vendor proprietary protocols.

Gaming machines, such as a slot machine or video poker machine, are becoming increasingly sophisticated. Many slot and gaming machines now employ processor driven systems that output information on CRT video display screens in place of more traditional mechanically-driven reel displays.

There are a wide variety of associated devices that can now be connected to a processor driven gaming machine. Some examples of these devices are player tracking units, lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine manages various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to manage input devices, including bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

The operations described above may be carried out on a gaming machine when the gaming machine is operating as a "stand alone" unit or linked in a network of some type to a group of gaming machines. As technology in the gaming industry progresses, more and more gaming services are being provided to gaming machines via proprietary networks that link groups of gaming machines to a remote computer that provides one or more proprietary gaming services. As an example, gaming services that may be provided by a remote computer to a gaming machine via a proprietary network of some type include player tracking services, accounting services, electronic funds transfers to/from the machine, external wins/awards, ticket redemption, lottery services, progressive game services and bonus games.

Typically, network gaming services enhance the game playing capabilities of the gaming machine or provide some operational advantage in regards to maintaining the gaming machine. Thus, gaming services provided to groups of gaming machines linked over a proprietary network have become very desirable in the gaming industry.

A current barrier to increasing the number of network gaming services provided to groups of gaming machines is the complexity of the proprietary communication networks associated with providing those network gaming services. Within the gaming industry, the evolution of network gaming services has produced a gaming service network environment where each network gaming service is provided utilizing a separate proprietary communication protocol, and associated network hardware. As a hardware. As a result, the communication protocols and hardware used to provide one network gaming service by one manufacturer is typically incompatible with the communication protocol and hardware used to provide a second network gaming service provided by another manufacturer.

As a result, the current proprietary networked gaming arena uses many proprietary gaming services that have been developed by different manufactures and rely on an abundant number of independent and concurrently running proprietary communication protocols and networks. Thus, to provide four network gaming services to a gaming machine, such as player tracking, bonus games, progressive games and cashless ticketing, four separate communication protocols and hardware networks are typically used.

For gaming machine operators and gaming machine manufacturers, a number of disadvantages arise from the lack of standardization. A first disadvantage is that the variations of hardware and protocols from manufacturer to manufacturer add to the complexity of the design and maintenance of a gaming machine network. Currently, there are at least 19 different companies that manufacturer player tracking units that can be mounted in a gaming machine. Each of these companies use different hardware and different communication protocols to implement their player tracking unit.

Other disadvantages include: 1) disruptions to gaming operations when a new gaming service network is added, 2) the cost of installing entirely new network hardware or implementing a new protocol each time a gaming service is added, 3) costs associated with maintaining a complex network involving multiple gaming service networks and protocols supported by different vendors and 4) difficulties associated with moving gaming machines connected to a complex set of multiple gaming service hardware networks (e.g. to reconfigure a casino floor).

In view of the above, it would be desirable to provide a gaming machine network that reduces complexity of gaming machine networks.

SUMMARY OF THE INVENTION

This invention provides gaming machine systems and methods that implement open architecture communication and allow flexible data transmission between gaming machines and other devices and nodes connected to a gaming machine network. The gaming machine and other devices employ a communication interface that sends and receives data via a common communication protocol. The communication interface and common communication protocol allow data transfer between gaming machines and other network nodes such as gaming service servers, despite the presence of different proprietary gaming machine functions and proprietary communication protocols—and despite the presence of various proprietary hardware and proprietary communication protocols relied on by the servers.

Regardless of the originating format, gaming machine data and messages according to the present invention are packaged and transmitted across the network according to the common network protocol. A receiving communication interface then unpackages the data from the common network protocol and may process or further transmit the data as desired. A communication interface is thus associated with each end of the transmission. More specifically, a communication interface packages—and unpackages—gaming machine data and messages into—and out of—the common network communication protocol from one or more non-network communication protocols. For example, the communication interface may package data normally transmitted in a proprietary gaming machine communication protocol into the common network communication protocol for a wide array of proprietary communication protocols and gaming machine services on one common pipe.

The techniques of the present invention may use common hardware to communicate across the network. This reduces the amount of wiring and associated hardware required to communicate across the network in all the dissimilar proprietary communication protocols normally used. Thus, communication interfaces as described herein allow a gaming machine to send and receive data originally transmitted across native and proprietary hardware—without requiring the gaming machine to implement the dedicated and disparate proprietary hardware, such as network wiring, outside of the communication interface. In some cases, a common network connection from the communication interface may be used for communication with numerous servers that communication with numerous servers that each employs a different proprietary communication protocol.

The techniques of the present invention are particularly useful when a number of gaming machine functions on a gaming machine each operate with a different communication protocol and different communication hardware. For example, a first communication interface (i.e. layer) of the present invention may be responsible for re-packaging gaming machine data produced (and conventionally transmitted) in a proprietary gaming machine communication protocol into a common network protocol. The first network interface may be associated with a gaming machine server that provides services such as progressive game services, bonus game services, player tracking services, cashless ticketing services, game downloading services, prize services, entertainment content services, concierge services, lottery services and money transfer services. Each service may utilize a different communication protocol. A second network interface layer may then be responsible for unpackaging the data from the common network protocol. The second network interface may be included in a gaming machine or included in a peripheral device associated with the gaming machine, e.g., in a player tracking unit. For the player tracking unit, the interface may also be responsible for further transmitting the data to the gaming machine (or a peripheral device associated with the gaming machine awaiting the transmission) in the proprietary gaming machine communication protocol.

The communication interface may be employed in the open architecture network in a number of ways. In one embodiment, a gaming machine of the present invention includes the communication interface within the gaming machine, e.g., on a communication board. It is also contemplated that a peripheral device, such as a player tracking unit, in communication with the gaming machine may include the communication interface. In another embodiment, the communication interface is a dedicated communication peripheral device in communication with the gaming machine. Further, servers that provide a gaming service in the gaming network, such as general accounting and player tracking servers, may employ a communication interface that translates between proprietary communication protocols and the common network protocol. Regardless of where it is implemented in a gaming machine network, the communication interface may be thought of as a translator between any proprietary communication protocols and the common network protocol.

In one aspect, the present invention relates to a gaming machine implemented on a gaming machine network. The gaming machine comprises a master gaming controller designed or configured to manage a game played on the gaming machine. The gaming machine employs a first communication protocol for implementing a first gaming machine function and employs a second communication protocol for implementing a second gaming machine function. The gaming machine also comprises a communication interface device in communication with the master gaming controller. The communication interface device is designed or configured to communicate data in both the first and second communication protocols and communicate the data in a third communication protocol over a gaming machine network using the third communication protocol.

In another aspect, the present invention relates to a communication interface for communicating between a gaming machine and a gaming machine network. The interface comprises multiple non-network communication ports. The first non-network communication ports allows communication of data according to communication protocol one. The second non-network communication ports, allows communication of data according to communication protocol two. The interface also comprises a network communication port. The network communication port allows communication of data according to a third communication protocol.

In yet another aspect, the present invention relates to a method of providing data between a gaming machine and one or more gaming machine servers in a gaming machine network. The method comprises configuring a first communication port included in a communication interface to communicate data according to a first communication protocol used by a first gaming machine function on the gaming machine. The method also comprises configuring a second communication port included in the communication interface to communicate data according to a second communication protocol used by a second gaming machine function on the gaming machine. The method further comprises establishing a communication connection between the communication interface and a server in the network using a third communication protocol. The method additionally comprises transmitting data from the server to the communication interface using the third communication protocol. The method also comprises converting the data from the third communication protocol to one of the first and second communication protocols. The method further comprises comprises transmitting the data from the communication interface to a processor in the gaming machine or to a peripheral device associated with the gaming machine in the one of the first and second non-network communication protocols.

In still another aspect, the present invention relates to a gaming machine implemented on a gaming machine network.

The gaming machine comprises a master gaming controller designed or configured to manage a game played on the gaming machine. The gaming machine employs a first proprietary communication protocol for implementing a first proprietary gaming machine function. The gaming machine also employs a second proprietary communication protocol for implementing a second proprietary gaming machine function. The second proprietary communication protocol is different from the first proprietary communication protocol. The gaming machine also comprises a communication interface device in communication with the master gaming controller. The communication interface device is designed or configured to communicate data in both the first and second communication protocols and communicate the data in a third communication protocol over a gaming machine network using the third communication protocol.

In another aspect, the present invention relates to a player tracking unit in communication with a gaming machine and a gaming machine network. The player tracking unit comprises processor logic that employs a player tracking communication protocol for implementing a player tracking service. The player tracking unit comprises a communication interface device in communication with the gaming machine and the gaming machine network. The communication interface device is designed or configured to communicate data in both the player tracking communication protocol and a second communication protocol with the gaming machine and communicate the data in a third communication protocol over the network using a third communication protocol.

Another aspect of the present invention provides a player tracking system. The player tracking system may be generally characterized as including: a player tracking server, a plurality of gaming machines with player tracking units and a network designed or configured to allow communication between the plurality of gaming machines and the player tracking server. The player tracking server and gaming machines each employ a common and non-proprietary communication protocol and protocol and hardware.

Another aspect of the invention pertains to computer program products including a machine-readable medium on which is stored program instructions for implementing the methods described herein. Any of the methods of this invention may be represented as program instructions and/or data structures, databases, etc. that can be provided on such computer readable media such as smart card, compact flash memory card, memory stick, RAM, CD-ROM, CD-DVD, hard drive, etc.

These and other features and advantages of the invention will be described in more detail below with reference to the associated drawings.

DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1A:
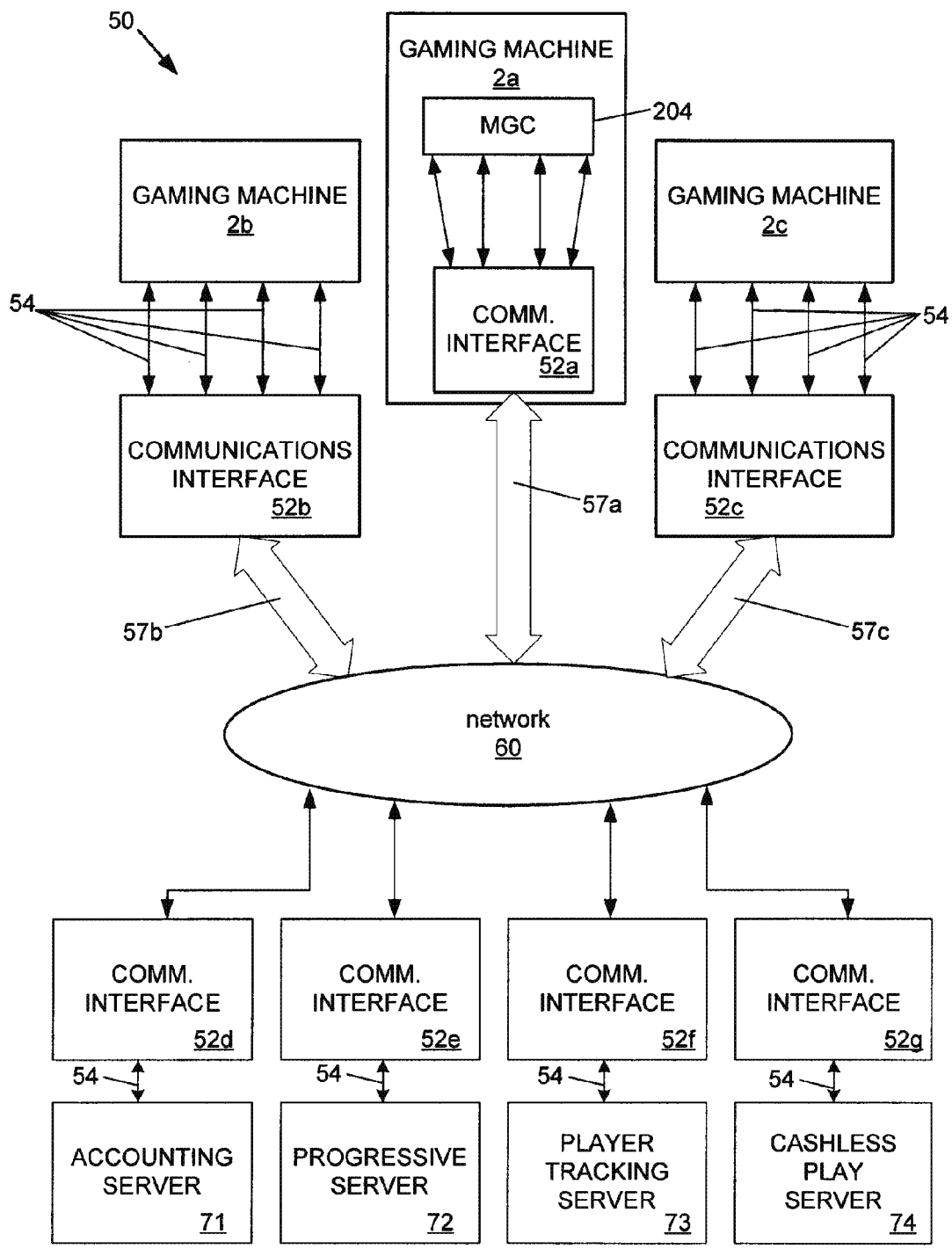
FIG. 1A is a block diagram of a gaming machine network employing multiple communications interface devices in accordance with one embodiment of the present invention.

FIG. 1A illustrates a block diagram of a gaming machine network 50 that employs communications interfaces in accordance with one embodiment of the present invention. Gaming machine network 50 includes a community of gaming machines 2, servers 71-74, communication interfaces 52, and a network 60 that provides digital communication between all nodes in gaming machine network 50.

A few examples of network 60 connecting gaming machines 2 and one or more of servers 71-74 include a casino area network, a wide area progressive network, a bonus game network or a cashless system network. For simplicity only three gaming machines are shown in FIG. 1A. Typically, network 60 connects each gaming service server 71-74 to a group of gaming machines. For instance, in a casino, accounting server 71 may communicate with hundreds of gaming machines located on the casino floor. In addition, the number and types of gaming services may vary from gaming machine to gaming machine. For example, on a casino floor, only a fraction of the gaming machines may be connected to a progressive game server 72 while nearly all of the gaming machines will be typically connected to the accounting server 71.

Servers 71-74 each provide a separate gaming service for gaming machines 2 across network 60. More specifically, four different servers providing gaming machine services are shown: accounting services provided by an accounting server 71, progressive gaming services provided by a progressive server 72, player tracking services provided by a player tracking server 73, and cashless pay services provided by by a cashless pay server 74. Each service provided by servers 71-74 transmits data according a proprietary communication protocol and proprietary hardware.

Communication interfaces 52*d*-52*g* provide data transmission and communication protocol translation services for accounting server 71, progressive server 72, player tracking server 73, and cashless player server 74, respectively. As is typical in the gaming industry, a separate remote computer, network hardware and connection scheme is usually used to provide each network gaming service onto a dedicated network. Each type of server 71-74 may thus utilize a different proprietary communication protocol, remote computer, proprietary network hardware and proprietary connection scheme to communicate game information within network 50. A communication interface 52 for each server is then responsible for providing data transmission services for each server 71-74 onto the common protocol and hardware used on network 60. The data transmission services include communication protocol packaging, unpackaging and translation services to and from a common communication protocol used in network 50 for each service 71-74, regardless of the proprietary communication protocol used by each server 71-74. The communication interface 52 for each server also provides hardware connectivity for each service 71-74 to a common hardware used in network 50, regardless of any concurrently running proprietary hardware employed by each server 71-74.

As shown, gaming machines 2a-2c are each in digital communication with communication interfaces 52a-52c, respectively, via game service connections 54. Gaming machine 2a thus communicates with network 60 and any devices and services connected therewith through communication interface 52a. Similarly, gaming machines 2b and 2c communicate with network 60 through communication interfaces 52b and 52c, respectively. The communication interfaces 52b and 52c are external to gaming machines 2b and 2c. The communication interface 52a is disposed inside of the gaming machine 2a.

As the term is used herein, a communication protocol refers to a set of conventions governing the treatment and formatting of data between two devices in system 50. The protocol determines, for example, how devices in network will send or receive a message, indicate when they have finished sending or receiving a message, the type of error checking to be used, and any method of data compression if used. In used. In system 50, at least two layers of communication protocol are used: a network communication protocol used between interfaces 52 and one or more non-network communication protocols used between interfaces 52 and any other device in the network. The communication interfaces 52 then convert between the two layers, as required. For example, player tracking server 73 may utilize one proprietary communication protocol between player tracking server 73 and interface 52f. Accounting server 71 providing accounting services may utilize a second proprietary communication protocol between accounting server 71 and interface 52d. Communication interfaces 52f and 52d translate data and messages from the proprietary communication protocol used by each server to a network communication protocol that carries data to any other communication interface 52. A communication interface 52a-52c for one of the gaming machines 2a-2c may receive and remove the data from the network communication protocol and transmit the data to one of the gaming machines 2a-2c in the proprietary communication protocol used by the sending server 71 or 73.

The communication interfaces 52 thus translate data from one communication protocol to another communication protocol. Typically, this comprises packaging and re-packaging data according to the network communication protocol. As the term is used herein, a network communication protocol refers to a communication protocol that is used between communication interfaces of the present invention. In one embodiment, the network communication protocol is a TCP/IP communication protocol. Other suitable network communication protocols suitable for use in system 50 include ATM, SLIP, PPP, or a layer/protocol transmitted on top of TCP/IP.

In one embodiment, the network communication protocol is non-proprietary. As the term is used herein, proprietary protocols and hardware encompasses protocols and hardware that have been developed, sold or maintained by a person, persons, company, or other entity in the gaming industry. This may include proprietary and application communication protocols developed by gaming machine manufacturers and gaming service suppliers.

System 50 uses non-network and proprietary communication protocols between interfaces 52 and gaming machines 2 or between interfaces 52 and servers 71-74. The proprietary protocols allow communication of data corresponding to one or more or more gaming machine functions. The gaming machine functions relate to, for example, games playable on the gaming machine, game expression on a gaming machine, or services provided by the gaming machine such as player tracking services, accounting services, bonus game services, progressive game services, concierge services, and cashless or cashless/ticketing services. The non-network and proprietary protocols are programmed in gaming software residing on a gaming machine 2 or a communication interface. For instance, the non-network communication protocols for gaming machine 2a include an accounting service protocol, a progressive game service protocol, a player tracking service protocol and a cashless/ticketing service protocol. In another embodiment for gaming machine 2b, the non-network communication protocols may include the accounting service protocol, the progressive game service protocol, the player tracking service protocol, the cashless/ticketing service protocol, a concierge service protocol and a bonus game service protocol. Thus, the number and type of non-network communication protocols residing on software in a gaming machine may vary from gaming machine to gaming machine.

For example, a proprietary communication protocol may include a player tracking unit protocol developed by a player tracking unit manufacturer. At the time of filing, there were as many as 19 different manufactures of player tracking units. Many of these manufacturers use different communication protocols. For example, player tracking units manufactured by International Game Technology (IGT) of Reno, Nev. use the Slot Accounting System (SAS) communication protocol which may be different from the communication protocols used by player tracking units manufactured by Bally's Gaming Systems or Acre's Gaming Incorporated. In some cases, different models of player tracking hardware from the same manufacturer may use different communication protocols.

Non-network communication protocols may also refer to application specific protocols that are programmed in gaming software residing on a gaming machine 2 or an associated peripheral device and utilized for communications therebetween. As an example, a player tracking communication protocol may be described in a generic communication protocol such as a mark-up language or a proprietary communication protocol used by a particular gaming machine function.

The non-network communication protocol may also include a physical communication protocol employed by physical devices that communicate data between a communication interface 52a-52c and a gaming machine 2, between a communication interface 52a-52c and a gaming machine peripheral device, or between a communication interface 52d-52g and a gaming machine service such as servers 71-74. Physical protocols may include serial communication protocols such as RS-422/485 and RS-232, and physical communication protocols associated with physical interfaces, etc.

Game service connections 54 allow data communication between each interface 52 and a gaming machine, peripheral device, server, or any other non-interface 52 device in system 50. A number of characteristics may be associated with each game service connection 54, including: 1) a physical interface with a physical communication protocol and 2) an application or proprietary communication protocol. The physical interface may include parameters such as the cable type, type of pin connectors, signal voltage levels and baud rate while the physical communication protocol may include parameters such as number of stop bits, number of start bits, parity and bits per byte. Asynchronous serial and synchronous serial are common. Typically, the proprietary protocol is a higher level protocol than the physical communication protocol and is carried over the physical interface using the physical communication protocol. Both of these may be packaged in the network protocol by a communication interface 52 for communication between interfaces 52. Thus, for instance, a message from the accounting server 71 requesting meter information on the gaming machine 2a, such as "coin in", may be translated into a format consistent with the physical communication protocol and physical interface from a proprietary accounting protocol, transmitted to communication interface 52d, repackaged into the network communication protocol implemented by communication interface 52d, sent to communication interface 52a, unpackaged from the network communication protocol, and sent to the gaming machine 2 in the physical communication protocol and physical interface.

RS-422/485, Fiber Optic, RS-232, DCS Current Loop, Link Progressive Current Loop, FireWire, Ethernet and USB are examples of physical interfaces with associated physical communication protocols which may be utilized on one of the connections 54. RS-422/485 and RS-232 are serial communication protocols established by the Institute of Electronic and Electrical Engineers (IEEE). DCS Current Loop and Link Progressive Current Loop are proprietary communication standards developed by International Gaming Technology, Reno, Nev. FireWire is a cross-platform implementation of the high-speed serial data bus (defined by IEEE Standard 1394-1995) that can move large amounts of data between gaming machines and peripheral devices.

In one embodiment, a communication interface 52 receives gaming machine function data from a gaming machine 2 using four or eight communication ports leading to game service connections 54, where each communication port is connected one of the game service connections 54. The communication ports are configured to be compatible with the physical interface and physical communication protocol of each game service network interface connected to the port such that the message may be received in a non-network or proprietary communication protocol used by the gaming machine. For this invention, the number of game service servers, game service network interfaces and communication ports may vary (e.g. 16 game service servers, 16 game service network interfaces and 16 communication ports) and is not limited to four or eight of each.

In addition to common network protocol usage between interfaces 52a-52g, system 50 employs common network communication hardware for data transmission between communication interfaces 52a-52g. As shown, communication interfaces 52a-52c each comprise a common network line, 57a-57c, to network 60. Data may be transmitted through the communication interface 52 using a single network line 57 connected to the output communication port. The communication interface 52 may be a wired Ethernet connection or any other communication medium allowing communication between interface 52 and network 60. In one embodiment where the network line 57 is a wired Ethernet connection, different wired connection schemes such as fiber optic cables, coaxial cables or twisted pair cables may be employed between interface 52 and network 60. One advantage to minimizing the number of wire connections between the communication interface 52 and network 60 is simplifying the process of reconfiguring a large number of gaming machines on a casino floor that use this system. Universal Serial Bus (USB) (Communication protocol standards by the USB-IF, Portland, Oreg., http://www.usb.org) is another communication methodology suitable for use with network line 57. Network lines 57 may use a wire connection scheme, a wireless connection scheme or combinations of wireless and wire connection schemes to connect the network nodes, gaming machines and game service servers.

The communication interface 52 may convert data and messages received at each communication port to a network communication protocol such that the messages from each communication port may be sent via a network line 57, which is connected to a network communication port on the communication interface 52. Messages to all of the game service servers 71-74 and other network 60 nodes from a gaming machine 2 may be transmitted via the network communication port. For instance, when the communication interface 52 uses a TCP/IP communication protocol as the network communication protocol, messages received at each communication port via connections 54 may be encapsulated, addressed and sent to the appropriate game service server using TCP/IP. The encapsulation, addressing and sending of messages is performed with processor logic stored on the communication interface 52. In a specific TCP/IP embodiment, each communication interface 52 may be assigned an IP address.

Communication interface 52a may receive messages from the four game service servers 71-74 via the network line 57 at the network communication port on the communication interface 52 in the network communication protocol. Using processor logic, the communication interface 52 may determine a destination communication port for each message, convert the message to the non-network communication protocol associated with each port and send each message to the destination communication port. For instance, when TCP/IP communication protocol is the network communication protocol and the accounting server 71 and the gaming machine 2 communicate using a TCP/IP protocol the network communication port of communication interface 52d and the network communication port of communication interface 52a, the accounting server may encapsulate a data in SAS for the gaming machine 2 and send it to communication interface 52d, which transmits the data in using a TCP/IP protocol to communication interface 52a. When the communication interface 52a receives the data at the network communication port, the communication interface 52a may un-encapsulate (unpackage) the data and send it in the SAS protocol to the gaming machine 2 using a connection 54.

Communication interface 52 as well as other network 60 hardware may be transparent to the gaming machine 2. In one embodiment, the gaming machine 2 may send a message over one of the communication interfaces 52 assuming it will reach a particular game service server without any knowledge of the network 60 hardware between the gaming machine and the game service server. Additionally, the gaming machine 2 may receive a message from one of the game service servers over one of the communication interfaces 52 without knowledge of the network hardware between the gaming machine and the game service server.

One advantage of using a common network communication protocol, such as a TCP/IP protocol or another common communication protocol able to transport multiple proprietary protocols, in system 50 is that the number of connections into a gaming machine may be reduced. For example, in FIG. 1A, gaming machine 2a is connected to the network 60 via connection 57a. Thus, using a TCP/IP communication protocol, one connection may be used to communicate between gaming machine 2a and network 60 and any devices on network 60, including servers 71-74. In addition, one communication protocol may be used to communicate with a single server providing multiple services. For example, the server 71 may provide accounting services, player tracking services and progressive game services.

While performing various communication functions, a communication interface 52 may package and route messages without interpreting the contents of the messages. Thus, the communication interface 52 may package and route an encrypted message from a game service server to the gaming machine 2 without decrypting the message. For example, using a TCP/IP communication protocol, the encrypted message from the game service server may be received as a payload of an encapsulated message at the communication interface 52. The encrypted message may be un-encapsulated (unpackage) and forwarded to one of the communication ports and then decrypted at the gaming machine. Also, as part of the message conversion process, communication interface 52 may be used to encrypt messages. For example, before sending a message to one of the gaming service servers using network line 57, the communication interface 52 may encrypt the message.

The proprietary communication protocols and hardware used in system 50 may be application specific and vary greatly from manufacturer to manufacturer as well as from application to application. For example, a player tracking unit installed in the gaming machine 2c may be used to provide both player tracking information to the player tracking server 73 and accounting information to the accounting server 71 via communication interfaces 52c, 52d, and 52f. Many different companies manufacture player tracking units including: 1) Acres Gaming, Inc., Las Vegas, Nev., 2) Bally's Gaming Systems, Las Vegas, Nev., 3) Aristocrat, Inc., Reno, Nev., 4) Casino Data Systems, Las Vegas, Nev., 5) Gaming Systems International, Las Vegas, Nev., 6) IGT, Reno, Nev., 7) Mikhon Gaming Corporation, Las Vegas, Nev., 8) Sigma Game, Inc., Las Vegas, Nev., 9) WMS Gaming, Inc., Chicago, Ill. The proprietary communication protocol used by each player tracking unit manufacturer may be different for each manufacturer. According to system 50, each of these proprietary protocols is packaged in a network protocol, such as TCP/IP, for transmission between interfaces 52.

For instance, player tracking units manufactured by IGT may use a Slot Accounting System (SAS) protocol to conventionally send data between a player tracking unit and the accounting server 71. However, for system 50, a player tracking unit sends data from the player tracking unit to an interface 52, which then packages the data in network protocol and transmits the network stream to the receiving interface 52 in the network protocol. Packaging may include data organization and insertion into network packets. Each network packet may include a header with payload data attached to the header. The payload data is typically comprises gaming machine related data. The receiving interface unpacks the data from the network packets and protocol and sends it to the accounting server 71 in the SAS protocol. Player tracking units manufactured by Bally's gaming systems may use a Slot Data System (SDS) protocol to send information from the player tracking unit to an interface 52, which then packages the data in network protocol and transmits the network stream to the receiving interface 52, which then unpacks the data from the network protocol and sends it to an accounting server 71 in the SDS protocol. In some cases the functions of the accounting server 71 and the player tracking server 73 may be executed by the same server.

The proprietary protocol for different network gaming services may be the same same or different depending on the manufacturer providing the network gaming service and the type of the network gaming service. For instance, IGT may provide accounting services and player tracking services using SAS, but, may provide progressive game services using a progressive game service protocol different from SAS. In general, the connections 54 may carry messages in a variety of application specific protocols, including progressive game service protocols, bonus game service protocols, player tracking service protocols, cashless ticketing service protocols, game downloading service protocols, prize service protocols, entertainment content service protocols, concierge service protocols, lottery service protocols and money transfer service protocols.

In the past, gaming machine function software, communication protocols and communication hardware have been kept proprietary. The proprietary nature of the software and protocols makes it difficult for outside software vendors to develop player tracking applications. Another advantage of using a common communication protocol in system 50 is improved extensibility of the system. System 50 allows gaming manufactures and casino operators to add new extensions to protocols or new protocols that are able to share the common network communication protocol and hardware. This allows gaming manufactures and casino operators to add software and gaming machine functions that require new proprietary extensions and new proprietary protocols—without rewiring the entire network or adding a new hardware network. This also allows outside vendors to develop software for use in the system, such as player tracking software, without the need for developing, manufacturing, and installing proprietary hardware for the system. In this manner, the present invention facilitates open software and gaming function development in the gaming machine industry.

The open architecture provided by system 50 also allows for network functionality and services not conventionally associated with a gaming machine network. In many cases, hardware and software responsible for implementing networked communication services may be added to each network interface 52. The network services may include routing capabilities, efficient or enhanced switching practices, Gateway functions, and firewall functionality. For example, one or more communication interfaces 52 may implement firewall functionality that controls packet traffic within network 60 and provides virus protection. In a specific embodiment, a embodiment, a separate communication interface 52 is implemented in system 50 and dedicated to provide hosting functions for all communication interfaces 52 the system. Each communication interface 52 may also provide encryption and decryption services to protect the integrity of data transmitted within network 60.

Networked communication services according to system 50 also allow communication outside of local network 60. For example, local network 60 may be implemented in a casino and communication interface 52a provides communication services with a gaming machine manufacturer, such as IGT of Reno, Nev., located in a separate city away from the casino. In one embodiment, the present invention employs commercially available network topologies between communication interfaces 52.

For communication interfaces 52, a logic device in each interface may be configured to perform a number of communication functions. The logic device may 1) send gaming data to a network node such as one of the servers 71-74 and 2) receive gaming data from a network node such as another gaming machine or one of the servers 71-74. Further, each communication interface 52 may contain a memory arranged to store a) a plurality of different network, non-network and proprietary communication protocols, e.g., for communicating with master gaming controllers on different types of gaming machines and peripheral devices, b) a plurality of different network and non-network communication protocols to communicate with different servers 71-74.

Thus, to facilitate packaging and translation between communication protocols, any number of different network and non-network communication protocols may be stored in memory on a gaming machine 2 or communication interface 52 allowing the gaming machine or communication interface 52 to communicate data with many different devices. Typically, non-network protocols are loaded into software of its respective device, for example, when the gaming machine or communication interface is initialized. However, communication protocols may also be loaded and unloaded from software while the gaming machine or communication interface is operating.

As an example, a memory on the communication interface 52*a* may store or may be easily updated to store a proprietary communication protocol for a first type of player tracking server manufactured by IGT (Reno, Nev.), a second communication protocol for a second type of player tracking server manufactured by Bally Gaming systems (Las Vegas, Nev.) and a third communication protocol for a third type of player tracking server manufactured by Acres gaming (Las Vegas, Nev.). In this case, gaming machine 2*a* may communicate with the three different types of player tracking servers, as well as many other types of player tracking servers, without replacing the player tracking hardware on gaming machine 2*a*. Therefore, a communication interface 52*a* with a memory storing communication protocols for different types of player tracking and gaming machines may be installed for a gaming machine in a first casino using a first type of player tracking server or for a gaming machine in a second casino using a second type of player tracking server. An advantage of communication interfaces 52 that may communicate with many types of gaming service servers is that a gaming machine operator, maintaining a number of gaming machines connected to a particular sets of proprietary gaming services, may change the gaming services by reconfiguring software on each of the communication interfaces 52 and avoid replacing the gaming service hardware, e.g., player tracking hardware, for each gaming machine.

As another example, a memory on the communication interfaces 52 may store or may be easily updated to store communication protocols allowing the interfaces 52 to communicate with master gaming controllers on a number of different types of gaming machines such as gaming machine manufactured by IGT, Bally gaming systems and Acres gaming. Thus, each communication interface 52 may be configured to operate with a particular type of gaming machine by loading a communication protocol from the memory allowing the interface 52 to communicate with the master gaming controller of the particular type of gaming machine. In addition to changing the communication protocol software to deploy the communication interface 52 with different types of gaming machines, connection 54 hardware, such as cabling and pin connectors, in interface 52 may have to be modified to enable communications between the master gaming controller and the interface 52. In some embodiments of the present invention, a conventional communication connection 54 is employed in an interface 52 to simplify the connection process. An example of a standard connection example of a standard connection scheme and communication protocol for a gaming machine such as USB is described U.S. patent application Ser. No. 09/414,659 entitled STANDARD PERIPHERAL COMMUNICATION, filed Oct. 6, 1999 which is incorporated in its entirety and for all purposes.

Figure 1B:
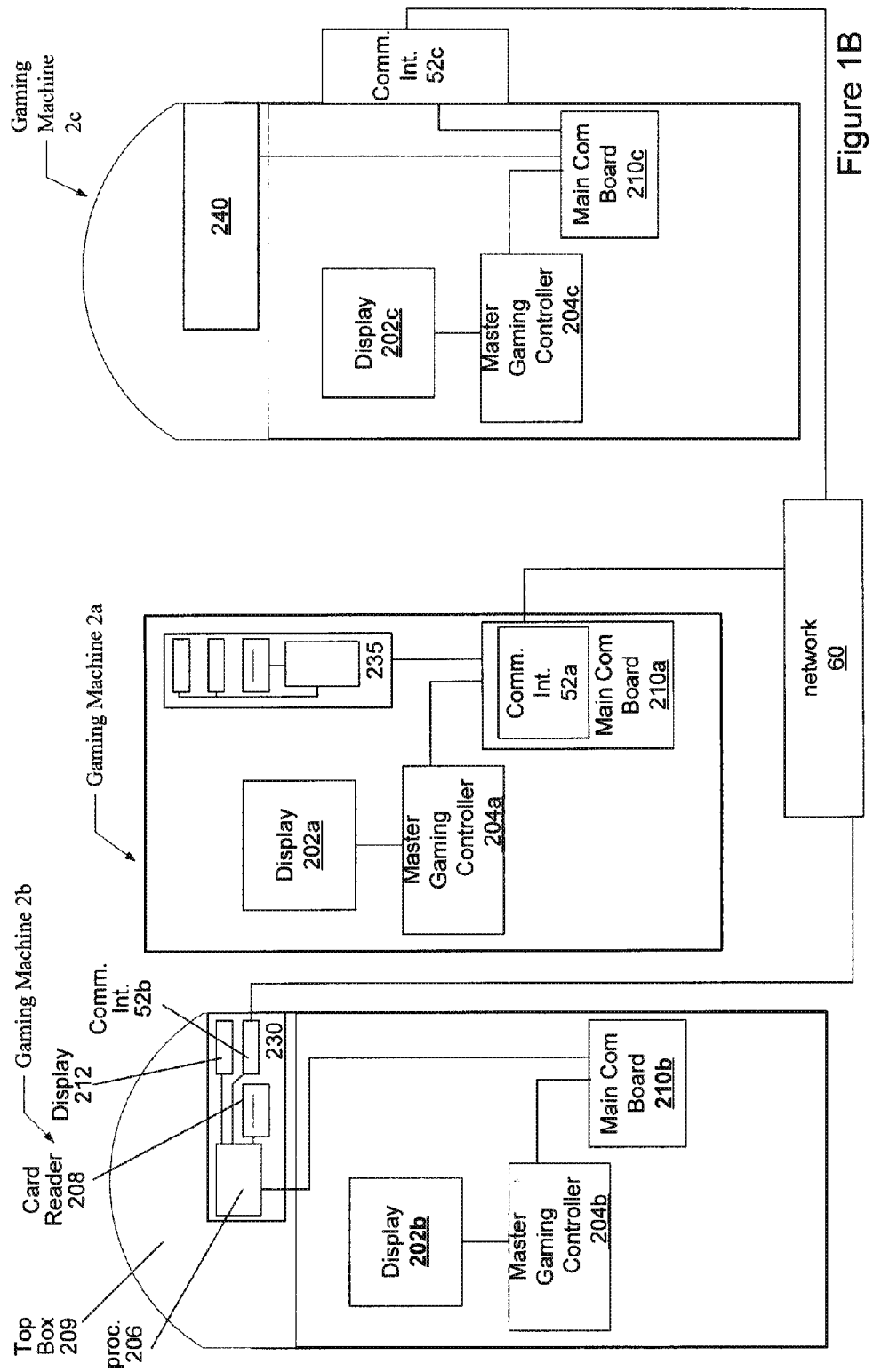
FIG. 1B is a block diagram of the gaming machines of FIG. 1A and their associated communication interfaces.

FIG. 1B is a block diagram of gaming machines 2*a*-2*c* with embodiments of communication interfaces 52 of the present invention. Communication interface 52*b* is included in a player tracking unit 230 that is located within a top box 209 mounted on gaming machine 2*b*. Communication interface 52*a* is included in a main communication board 210*a* within a main cabinet of gaming machine 2*a*. Communication interface 52*c* is a dedicated communication interface mounted on the side of a main cabinet of gaming machine 2*c*. The gaming machines 2*a*-2*c* each contain a display 202, a master gaming controller 204 and a main communication board 210. The main communication board 210 manages data traffic transmitted to and from each gaming machine 2.

The main communication board 210 may be utilized by the master gaming controller 204 to communicate with devices outside of the gaming machine such as game service servers described with reference FIG. 1A or devices within the gaming machine 2 which the master gaming controller 204 does not directly control. For example, master gaming controller 204*b* does not directly control the player tracking unit 230 and the communication interface 52 included in the player tracking unit 230. Thus, master gaming controller 204 communicates with these devices using the main communication board 210 as a communication interface. Further, when communication interface 52*c* is located outside of the gaming machine 2, the master gaming controller may communicate with these devices using the main communication board 210 in the same manner as when the devices are mounted within the main cabinet 8 of the gaming machine 2. The communication interface 52 may receive all messages transmitted by the gaming machine 2 via the main communication board 210 used by the gaming machine and may receive all messages sent to the gaming machine from outside devices such as game service servers. It is noted that the present invention is not limited for use with a main communication board 210 and may be connected to any appropriate interface on the gaming machine.

In FIG. 1B, the gaming machines 2 and player tracking units 230, 235 and 240 communicate with network 60 and any of its service nodes via communication interfaces 52. For example, the player tracking units 230, 235 and 240 communicate with the master gaming controller 204 and may communicate with a data control unit connected to a player tracking server in network 60 via communication interfaces 52. The present invention may be employed with many different connection schemes between a player tracking unit, master gaming controller, communication interface 52 and network 60 and is not limited to the examples shown in FIG. 1B. For instance, the communication interface 52*b* in player tracking unit 230 may be directly connected to the master gaming controller 204 bypassing the main communication board 210. In another example, the communication interface 52*b* in player tracking unit 230 may be connected directly to a master gaming controller 204 and directly to network 60 without using a main communication board 210. Player tracking units 230, 235 and 240 may also include other peripheral components such as a processor 206, card reader 208, display 212.

The master gaming controllers 204 manage one or more gaming machine functions such as games played on the gaming machine and displayed on display 202. Gaming machines that may use the communication interfaces of the present invention are not limited to video gaming machines and may be used with many types of pre-existing and future gaming machines. For instance, the gaming machines may be upright gaming machines, slant top gaming machines and bar top gaming machines providing video games of chance, mechanical slot games and combinations of video and mechanical games as well as bonus games. Games that may be played on the gaming machine with a player tracking unit of the present invention include a video bingo game, a video lottery game, a video black jack game, a video slot game, a mechanical slot game, a video poker game, a video keno game and a video pachinko game. The gaming machines may or may not include top boxes.

In particular embodiments, the master gaming controller may include one or more of the following: a) a memory arranged to store software for a network communication protocol, b) a memory arranged to store software for a non-network communication protocol such as a proprietary communication protocol used by one of the gaming machine functions of gaming machine 2, c) a memory arranged to store a plurality of device drivers for different types of gaming machine peripheral devices, d) d) software that allows the master gaming controller to detect gaming events on the one or more peripheral devices, e) software for a non-network communication protocol that allows communication with a gaming peripheral or other peripheral service via a peripheral communication connection (e.g., such as a USB communication protocol), and f) a plurality of different types of communication protocols allowing the gaming machine to communicate with a plurality of different types of gaming machine services such as accounting, player tracking, etc.

A gaming machine 2 may also include a peripheral communication connection to a communication interface 52, such as gaming machine 2c. Thus, the master gaming controller 204 may include a memory arranged to store software for a proprietary communication protocol that allows communication with communication interface 52 unit via the peripheral communication connection. In one embodiment, the peripheral communication connection is USB.

Figure 2A:
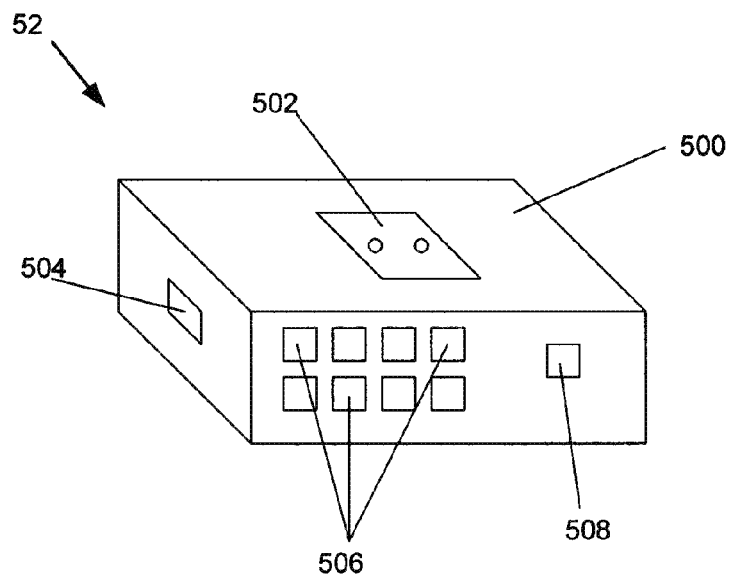
FIGS. 2A and 2B are block diagrams of a dedicated communication interface 52 in accordance with a specific embodiment of the present invention.
Figure 2B:
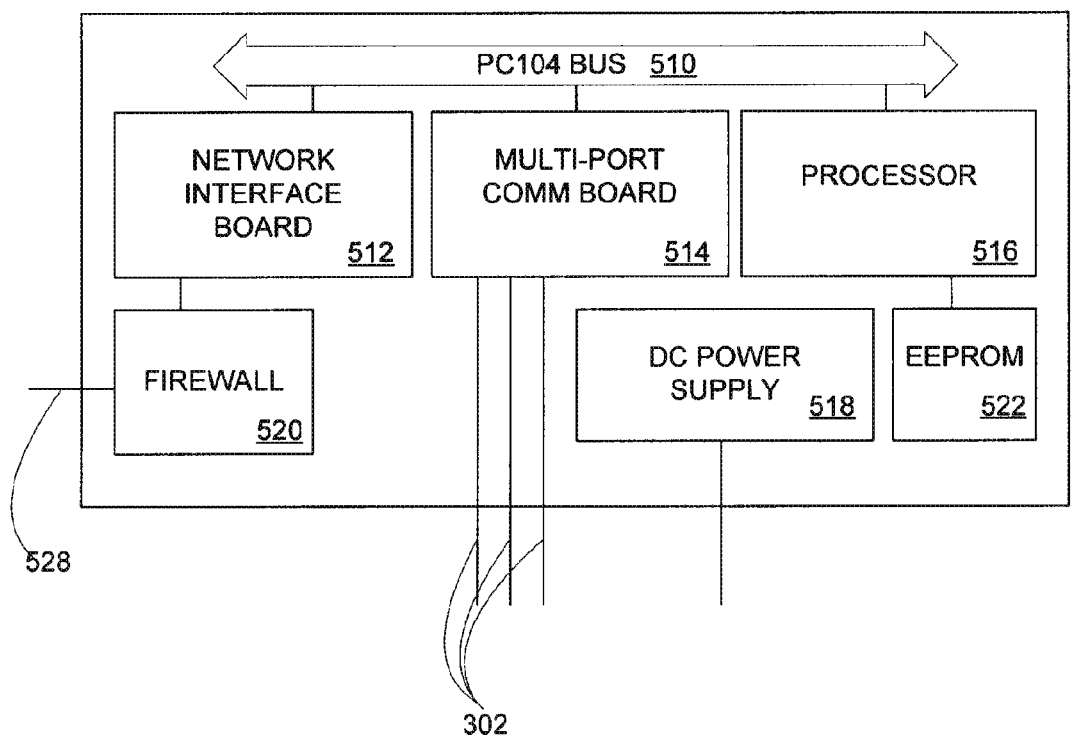

FIGS. 2A and 2B are block diagrams of communication interface 52c in digital communication with master gaming controller 204 on gaming machine 2c of FIG. 1B in accordance with a specific embodiment of the present invention. FIG. 2A shows the outside of the communication interface 52. In one embodiment, the communication interface 52 may be encased within an enclosure 500. The enclosure 500 may include a mounting bracket 502 for mounting the communication interface 52 to a surface such as a surface within the main cabinet of a gaming machine.

The enclosure 500 may contain a number of cut-outs for power interfaces and communication ports. A power interface 504 may be placed on one surface of the enclosure. A network communication port 508 and eight communication ports 506 are placed on the front of the enclosure. The communication ports 508 may be designed to accommodate different game service connections 54 as described with reference to FIG. 1A.

FIG. 2B is a block diagram of components used in the communication interface 52. The interface 52 may contain a separate DC power supply 518. A multi-port communication board 514 may receive communications from a number of game service connections 54 associated with each communication port 506. Each communication port 506 may be configured by the processor 516 to allow communications with a particular game service connection 54. In one embodiment, communications between the processor 516, the multi-port communication board 514 and the network interface board 512 may be transmitted over a PC 104 Bus 510.

As described with reference to FIG. 1A, each communication port 506 may be configured for a particular physical communication protocol that allows messages to be communicated in a particular proprietary communication protocol. For instance, when a particular game service interface utilizes an asynchronous serial physical interface, a processor 516 may configure a port on the multi-port communication board 514 to accept a certain baud rate, number of stop bits, number of stop bits and type of parity (e.g. none, odd, even and wake-up) which allow the communication interface 52 to receive communications from the gaming machine in a non-network communication protocol. In addition, the port may be provided a port number and host IP number which allows a game service server or some other device located outside of the gaming machine to address messages to a particular port on the communication interface 52. As another example, a port may be configured by the processor 516 to use a synchronous serial physical communication protocol. In this case, the bit rate, protocol type, Host IP address, CRC yes/no, CRC type and port number may be configured for the port. In one embodiment, processor 516 includes multiple processing sources where one of processing sources is an Intel Ethernet chip, such as the Intel 82558.

The ports on the multi-port communication board 514 may be reconfigurable. Thus, at one time, a first port on the multi-port communication board 514 may be configured as an asynchronous serial port and at a later time the first port may be configured as a synchronous serial port. Further, each port may be configured to transmit a different proprietary communication protocol from the gaming machine. Thus, a first port may receive an accounting service protocol, while a second port may receive a concierge service protocol, and a third port may receive a bonus game protocol. Also, the first port may be used to communicate with an accounting server, while the second port may communicate with a concierge server and the third port may communicate with a bonus game server. The processor 516 may obtain configuration information for each port from data stored in the EEPROM 522.

In addition, the EEPROM 522 may contain all of the processor logic used by the processor 516. For instance, the EEPROM 522 may contain processor logic allowing the processor to package messages from a non-network protocol to a network protocol such as from a proprietary communication protocol of the gaming machine to a network communication protocol such as TCP/IP. In addition, the EEPROM 522 may contain processor logic allowing the processor to encrypt messages.

The network interface board 512 allows the communication interface 52 to utilize a particular network interface 528, or network line 57 (FIG. 1A). For example, the network interface 528 may be a wired Ethernet connection or wireless radio connection where communication with the network interface is enabled by the network interface board 512.

Using TCP/IP and a common network protocol in a gaming system also allows for network services not typically associated with gaming machine networks to be added to a gaming machine system such as that described in FIG. 1A. For traffic maintenance purposes for example, a firewall 520 may be placed between the network interface board and the network interface 528. The internal firewall 520 may be hardware, software or combinations of both that prevent undesirable access of the gaming machine by an outside entity. For instance, an undesirable access may be an attempt to plant a program in the gaming machine that alters the operation of the gaming machine.

In another embodiment, communication interface 52 includes a multiplexer for multiplexing communications between a gaming machine and one or more game service servers. The multiplexer may be characterized as including: 1) processor logic that multiplexes and de-multiplexes messages between the one or more communication ports and the network communication port and that converts between the non-network communication protocol and the network communication protocol.

In specific embodiments, communication interface 52 may implement a TCP/IP communication protocol as the network communication protocol and the non-network communication protocols may be selected from the group consisting of a progressive game service protocol, a bonus game service protocol, a player tracking service service protocol, a cashless/ticketing service protocol, a game downloading service protocol, a prize service protocol, an entertainment content service protocol, a concierge service protocol, a lottery service protocol and a money transfer service protocol. A physical interface for the one or more communication ports may be selected from the group consisting of RS-422/485, Fiber Optic, RS-232, DCS Current Loop, Link Progressive Current Loop, FireWire, Ethernet and USB. The one or more communication ports may comprise 8 to 16 communication ports.

Figure 3:
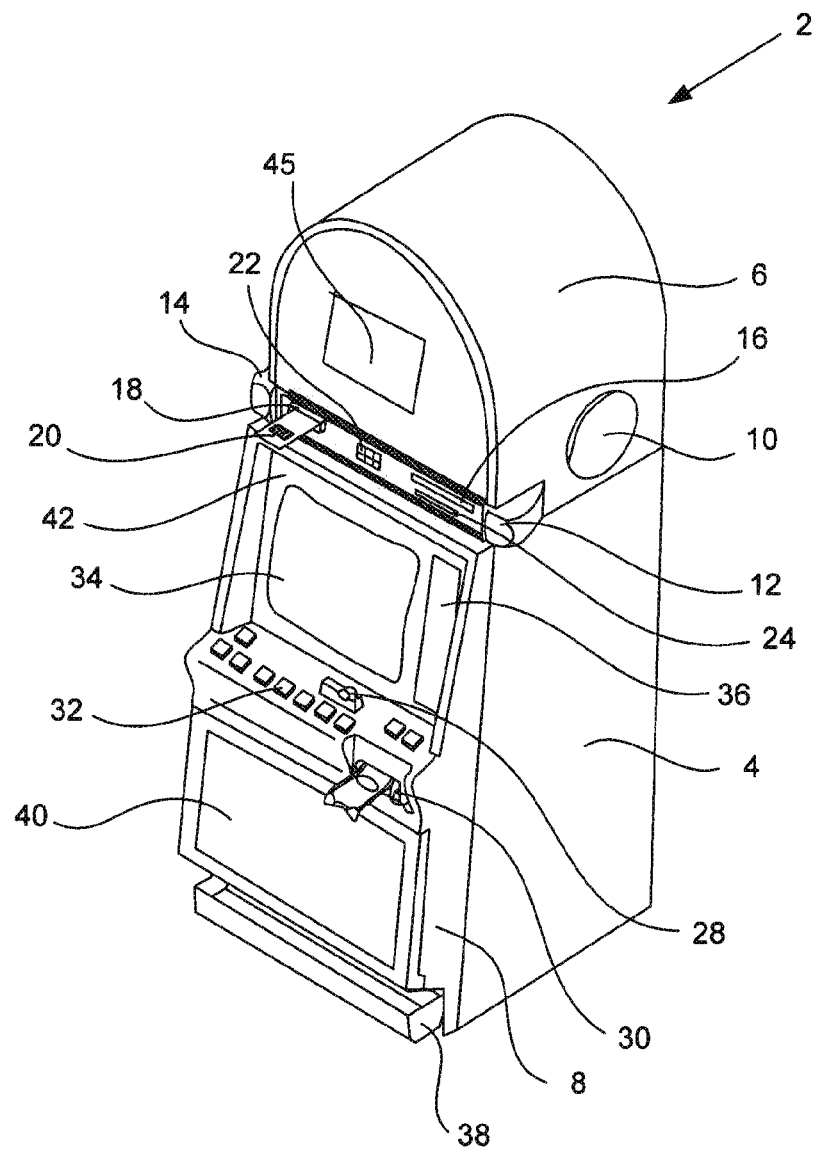
FIG. 3 illustrates a gaming machine of FIG. 1A in accordance with one embodiment of the present invention.

Turning to FIG. 3, more details of gaming machine 2a are described. Machine 2a includes a main cabinet 4, which generally surrounds the machine interior (not shown) and is viewable by users. The main cabinet 4 includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the game machine 2a. The devices are controlled by circuitry housed inside the main cabinet 4 of the machine 2a.

The gaming machine 2a includes a top box 6, which sits on top of the main cabinet 4. The top box 6 houses a number of devices, which may be used to add features to a game being played on the gaming machine 2a, including speakers 10, 12, 14, a ticket printer 18 which may print bar-coded tickets 20 used as cashless instruments. The player tracking unit mounted within the top box 6 includes a key pad 22 for entering player tracking information, a florescent display 16 for displaying player tracking information, a card reader 24 for entering a magnetic striped card containing player tracking information, a microphone 43 for inputting voice data, a speaker 42 for projecting sounds and a light panel 44 for display various light patterns used to convey gaming information. In other embodiments, the player tracking unit and associated player tracking interface devices, such as 16, 22, 24, 42, 43 and 44, may be mounted within the main cabinet 4 of the gaming machine, on top of the gaming gaming machine, or on the side of the main cabinet of the gaming machine.

Understand that gaming machine 2a is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present can be deployed on most any gaming machine now available or hereafter developed.

Returning to the example of FIG. 3, when a user wishes to play the gaming machine 2a, he or she inserts cash through the coin acceptor 28 or bill validator 30. In addition, the player may use a cashless instrument of some type to register credits on the gaming machine 2a. For example, the bill validator 30 may accept a printed ticket voucher, including 20, as an indicia of credit. As another example, the card reader 24 may accept a debit card or a smart card containing cash or credit information that may be used to register credits on the gaming machine.

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine.

During certain game functions and events, the gaming machine 2a may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2a, from lights behind the belly glass 40 or the light panel on the player tracking unit 44.

After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 2a. In some embodiments, these tickets may be used by a game player to obtain game services.

One related method of gaining and maintaining a game player's interest in game play are player tracking programs which are offered at various casinos. Player tracking programs provide rewards to players that typically correspond to the player's level of patronage (e.g., to the player's playing frequency and/or total amount of game plays at a given casino). Player tracking rewards may be free meals, free lodging and/or free entertainment. These rewards may help to sustain a game player's interest in additional game play during a visit to a gaming establishment and may entice a player to visit a gaming establishment to partake in various gaming activities.

Figure 4:
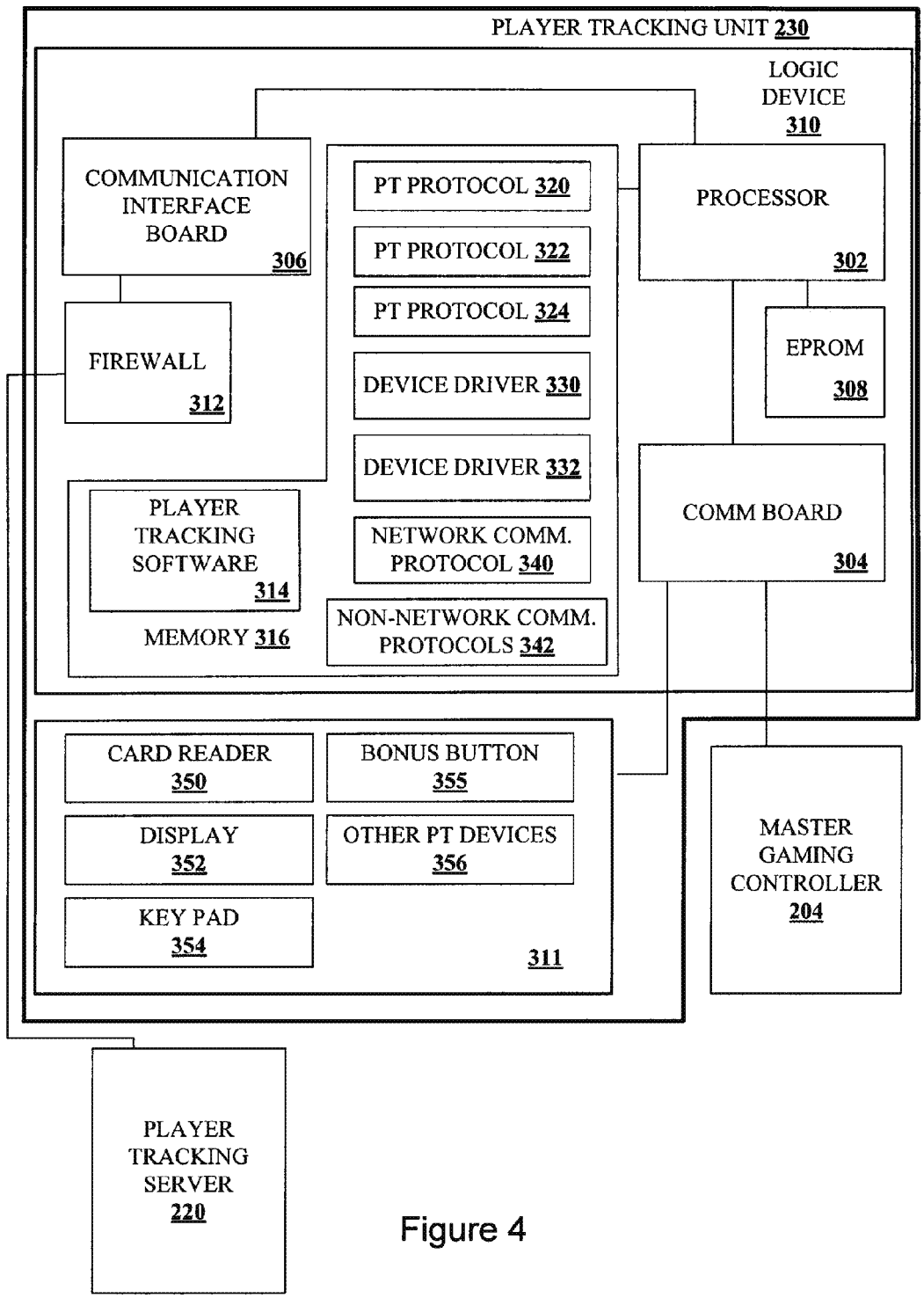
FIG. 4 is a block diagram of a player tracking unit in digital communication with a master gaming controller on a gaming machine in accordance with one embodiment of the present invention.

An open architecture network of the present invention using a common communication protocol may be achieved in a convention gaming machine network using a set of player tracking units. FIG. 4 shows an example of a player tracking unit that allows an open architecture network as described in FIG. 1. An advantage of this approach is that an existing gaming machine network may be upgraded to open architecture status, thus allowing expansion to proprietary software and other benefits unattainable on the gaming system network hardware before such an improvement.

The player tracking units may each include a communication interface and a memory arranged to store a plurality of different communication protocols allowing the player tracking units to communicate with a plurality of different types of gaming machines and a plurality of different types of gaming service servers via network and non-network communication protocols. The software on the player tracking unit may also be designed or configured to accommodate new communication protocols such as new player tracking and accounting communication protocols. The player tracking unit may contain many different types of player tracking peripheral devices such as card readers, key pads, displays, bonus buttons and biometric input mechanisms. To ease application of the present invention with established gaming machine networks, the the player tracking units may some standard hardware and software components allowing the player tracking unit to fit in many different types of conventional gaming machines with minimal modifications to the player tracking unit or the gaming machine.

FIG. 4 is a simplified block diagram of an embodiment of player tracking unit 230 in communication with master gaming controller 204b on gaming machine 2b (see FIG. 1B). The present invention is not limited to the player tracking network shown in the FIG. 4 and other possible elements of a player tracking system, such as a data collection units and translators, may also be used. Player tracking unit 230 includes a logic device 310 enclosed in a logic device housing and a number of player tracking devices including a card reader 350, a display 352, a key pad 354 and other player tracking devices 356 enclosed in a device housing 311. The logic device 310 for the player tracking unit and the player tracking devices may be single unit enclosed in a single housing or multiple units enclosed in one or more housings.

The logic device 310 may include a processor 302 for executing software allowing the player tracking unit to perform various player tracking functions such as communicating with network 60, communicating with the master gaming controller 204 or operating the various peripheral devices such as the card reader 350, the display 352, the key pad 354 and the bonus button 355. For instance, the logic device 310 may send messages containing player tracking information to the display 352. The logic device 310 may utilize a microprocessor or a microcontroller. In one embodiment, application software for the player tracking unit 230 and configuration information for the player tracking unit may be stored in a memory device such as an EPROM 308, a non-volatile memory, hard drive or a flash memory.

The player tracking unit may include a memory 316 configured to store: 1) player tracking software 314 such as data collection software, 2) player tracking communication protocols (e.g. 320, 322, 324) allowing the player tracking unit 300 to communicate with different types of player tracking servers, 3) device drivers for many types of player tracking devices (e.g. 330 and 332), 4) network communication protocols (e.g. 340) such as TCP/IP allowing the player tracking unit to communicate with network nodes and devices using these protocols and 5) non-network communication protocols (e.g. 342) allowing the logic device to communicate with different types of master gaming controllers (e.g. master gaming controllers using different types of communication protocols) such as 204, and other peripheral devices used in gaming machine 2b. Typically, the master gaming controller communicates with player tracking unit 230 using a serial communication protocol. A few examples of serial communication protocols that may be used to communicate with a master gaming controller include but are not limited to USB, and Netplex (a proprietary protocol developed by IGT, Reno, Nev.).

In some embodiments, the software units stored in the memory 316 may be upgraded as needed. For instance, when the memory 316 is a hard drive, new device drivers or new network and non-network communication protocols may be uploaded to the memory from the master gaming controller 204, the player tracking server 220 or from some other external device. As another example, when the memory 316 is a CD/DVD drive containing a CD/DVD designed or configured to store the player tracking software 314, the device drivers and communication protocols, the software stored in the memory may be upgraded by replacing a first CD/DVD with a second CD/DVD. In yet another example, when the memory 316 uses one or more flash memory units designed or configured to store the player tracking software 314, the device drivers and communication protocols, the software stored in the flash memory units may be upgraded by replacing one or more flash memory units with new flash memory units storing the upgraded software.

The logic device 310 includes a communication interface board 306 configured or designed to allow communication between the player tracking unit 230 and other network nodes and devices, such as a player tracking server residing on local area networks such as a casino area network or a wide area network such as the Internet. The communication interface board 306 may allow wireless or wired communication with the network devices. The communication interface board may be in communication with a firewall 312. Firewall 312 may be hardware, software or combinations of both that prevent undesirable access of the gaming machine by an outside entity connected to the gaming machine. The internal firewall is designed to prevent someone such as a hacker from gaining unintended access to the player tracking unit or gaming machine and tampering with it in some manner.

The communication board 304 may be configured to allow communication between the logic device 310 and the player tracking devices including 350, 352, 354, 355 and 356 and to allow communication between the logic device 310 and the master gaming controller 204. The communication between the player tracking unit 300 and 1) the player tracking devices, 2) the master gaming controller 204, 3) the network 60 and 4) any other external or internal gaming devices, may be encrypted.

The player tracking unit 300 may include one or more standard peripheral communication connections (not shown). The logic device 310 may be designed or configured to communicate with the master gaming controller 204 using a standard peripheral connection using a standard communication protocol such as USB. The USB standard allows for a number of standard USB connectors that may be used with the present invention. The player tracking unit 230 may contain a hub connected to the peripheral communication connection and containing a plurality of peripheral communication connections.

Figure 5:
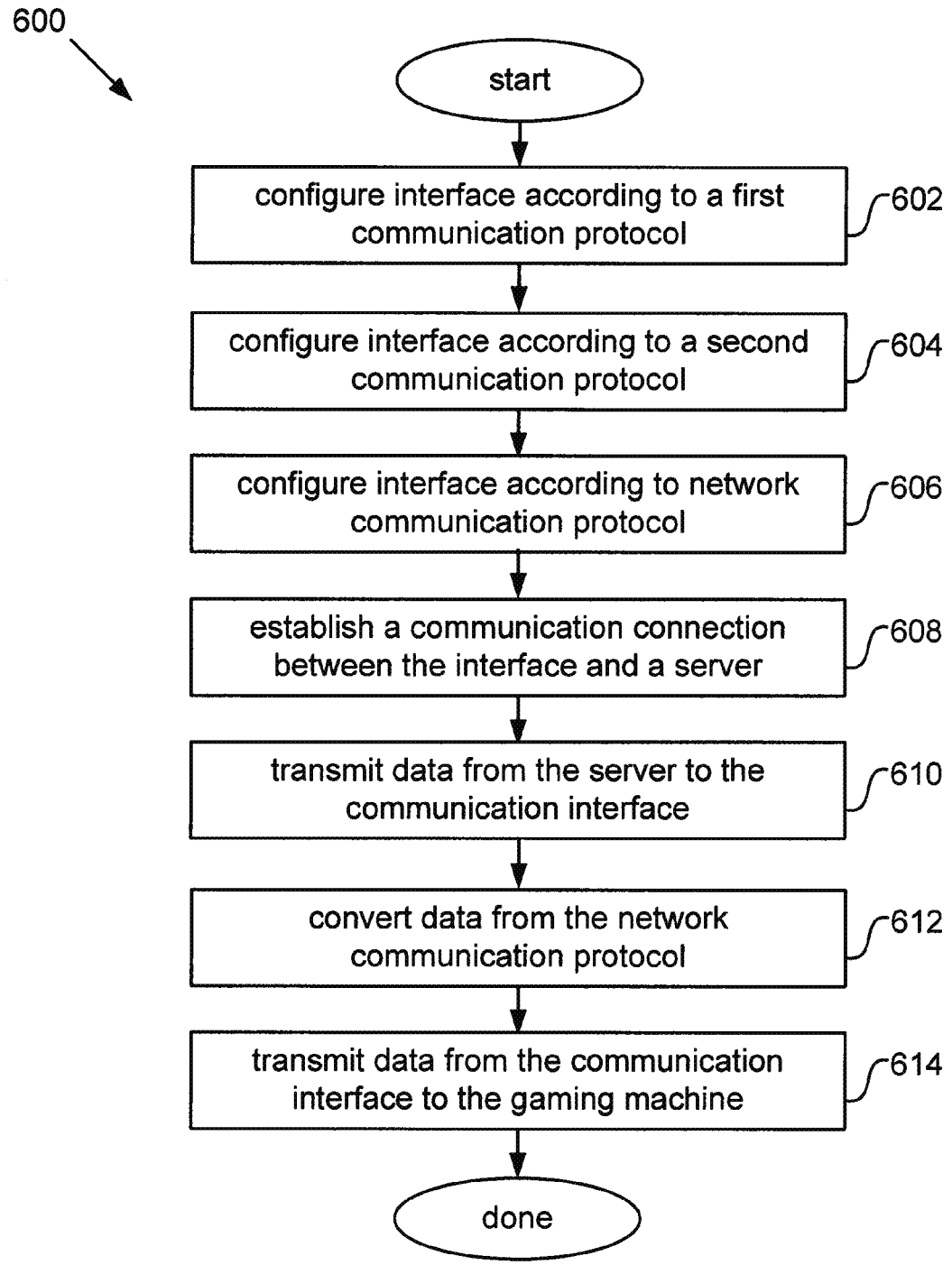
FIG. 5 is a process flow depicting a method providing communications between a gaming machine and one or more devices on a network, such as game service servers, using communication techniques of the present invention.

FIG. 5 is a process flow 600 depicting a method providing communications between a gaming machine and one or more devices on a network, such as game service servers, using communication techniques of the present invention. Process flow 600 may take place in any communication interface and gaming machine network, such as those described in FIG. 1. Processes in accordance with the present invention may include up to several additional steps not described or illustrated here in order not to obscure the present invention. While data transmission will now be described as a method, those skilled in the area will recognize that the present invention encompasses a system or software having units capable of performing the actions as described below.

Process flow 600 begins by configuring communication ports included in a communication interface. One communication port is configured to communicate data according to a first communication protocol used by a first gaming machine function on the gaming machine (602). A second communication port is configured to communicate data according to a second communication protocol used by a second gaming machine function on the gaming machine (604). The communication interface device may attain initial parameters for each communication port. In one embodiment, the parameters may be obtained from memory or a boot server. The configuration file configuration file for the communication interface device may be stored on the communication interface device, for example, on an EEPROM. All ports on a communication interface device are not necessarily used. For example, the communication interface device may contain 16 ports where only 5 are used.

The ports may each be mapped to different gaming machine functions and services. For instance, port 1 may communicate according to an accounting protocol, port 2 may communicate according to a bonus game protocol, port 3 may communicate according to a concierge service protocol and port 4 may communicate according to a cashless ticketing protocol. A physical communication protocol (e.g. asynchronous serial or synchronous serial) is also set for each port. The physical communication protocol allows messages in the application or proprietary protocol to be transmitted using the communication port.

Configuration according to 602 and 604 may also include establishing a connection between each port and the device associated with the port. For example, when port 2 communicates with a master game controller for bonus game services, then communication between the master game controller and port 2 is established.

When the communications interface is implemented within a player tracking unit, the communications interface establishes communication with a master gaming controller on the gaming machine using an initial communication protocol of some type. To do so, the communications interface determines the gaming machine type and configures itself to communicate in a communication format used by a master gaming controller on the gaming machine such as USB or RS-232. The player tracking unit may determine which gaming machine functions and services are to be executed by the communications interface. The gaming machine functions and services may be distributed between logic devices located on the player tracking unit, located on the gaming machine, or other gaming peripheral devices. For example, the master gaming controller may send game usage information directly to the player tracking server. In this example, the player tracking unit may not poll the gaming machine for game usage information because this player tracking function is performed by the gaming machine.

The communications interface may optionally establish communications with each of the peripheral devices using an initial communication protocol such as USB and determine the peripheral device types. For instance, the peripheral device type may be a card reader by a particular manufacturer. The communications interface, player tracking unit or gaming machine may load peripheral device drivers for each type of peripheral device. Some of the peripheral devices may be operated by a master gaming controller on the gaming machine.

Process flow 600 then proceeds by establishing a communication connection between the communication interface and a server or node in the network using a third communication protocol (606). In general, any device capable of TCP/IP communications may communicate with a communications interface of the present invention. In embodiments where TCP/IP is implemented as the network protocol, this implies that the communication interface knows the IP address of the server or device being contacted. In addition, the communication interface may receive an IP address from a boot server upon initial powering and after internal self checks. This may include contact with a boot server using a TCP/IP protocol to obtain the IP address. To obtain an IP address, the communication interface device may send a MAC (media access) address to the boot server. After authentication of the MAC address by the boot server, the boot server may assign the communication interface device an IP address.

The communication interface may then establish a communication connection with a device or node on the network such as a remote server (608). For instance, a TCP/IP communication may be used to establish connections with the remote server. After establishing communications between the ports and devices associated with each end of the transmission, the communication interface device may be used as a conduit for communications between the server and the gaming machine.

Data is then transmitted from the server to the communication interface using the network communication protocol (610). For example, the communication interface may download gaming machine data from the remote server. Process flow 600 is particularly useful for downloading gaming software from a remote server, such as a gaming software provider not local to a casino, to one or more gaming machines in the casino. One advantage of downloading gaming software in this manner is that it may manner is that it may simplify the process of upgrading software, such as upgrading games playable on the gaming machine.

After the data is received, it may then be converting the data from the network communication protocol to one of the first and second communication protocols (612). The data is then transmitted from the communication interface to the gaming machine in the one of the first and second non-network communication protocols (614). After the data is received by the gaming machine, the gaming machine may load or otherwise use the data downloaded from the communication interface.

When new gaming software is developed, that gaming software is typically submitted, for approval, to an official approval agency of each gaming jurisdiction in which the gaming software will be used. The new gaming software is evaluated by each official approval agency according to rules established in the gaming jurisdiction of the agency. Gaming machine software that is regulated by a gaming jurisdiction may be referred to as "regulated gaming software." When gaming software is approved in a jurisdiction, a unique signature is devised for the regulated gaming software and the gaming signature is registered with the jurisdiction. The unique signature is used to insure gaming software installed on a gaming machine has been approved. Usually, the signature for the gaming software on each gaming machine is inspected after is shipped to a particular gaming jurisdiction to determine whether the signature for the gaming software matches a gaming signature approved for the gaming machine. A gaming machine with an invalid signature is not allowed to operate. This procedure, which may be time consuming and expensive, may be required each time software is modified on the gaming machine.

For instance, for many gaming machines currently operating (nearly 700,000), most of the software on the gaming machines may be provided on EEPROMs where the software on the EEPROMs allows the master gaming controller to provide all gaming functions on the gaming machine such as game play and communications. Using EEPROMs, a gaming machine may be used to provide many different games. However, a different EEPROM may be used for each game. When new gaming software for an EEPROM is developed, it is submitted for testing and approval. After the gaming software is approved, it is typically burnt onto the EEPROM.

The number of bits stored on the EEPROM may be summed in some manner to provide a unique signature for each type of EEPROM. The signature for each type of EEPROM may be registered with each gaming jurisdiction. When a gaming machine with a particular EEPROM arrives in a particular gaming jurisdiction, the EEPROM is tested to verify its authenticity against a registered game signature for the EEPROM using a testing device of some type. When the signature for the tested EEPROM does not compare with the registered signature for the EEPROM, the EEPROM may not be used. Hence, the gaming machine using the EEPROM may not be operated until an approved EEPROM is installed in the gaming machine.

Some communication functions provided by the multiplexer communication device 304, such as protocol capabilities, could be provided by modifying software on the gaming machine. However, since each time the software on an existing gaming machine is modified it must be submitted for re-approval, this approach may be impractical. For instance, in the example above, a new EEPROM with additional communication software could be developed and installed on a gaming machine after the EEPROM passed the approval and inspection process. Currently, nearly 700,000 gaming machines are being utilized in jurisdictions where gaming software is regulated. The installation of new protocol communication software on all of these gaming machines might cost hundreds of millions of dollars. Further, the process would have to be repeated each time new protocol communication software was installed. Thus, since the communication interface 52 provides additional communication capabilities to the gaming machine without modifying regulated gaming software on the gaming machine, an advantage of using communication interface 52 to provide communication functions may be reduced costs associated with re-approval of software on the gaming machine.

One advantage of open architecture communication techniques described herein is improved communication extensibility. For instance, to upgrade the communication protocol on an existing player tracking server or to utilize a new player tracking server that utilizes a more efficient communication protocol to transfer gaming information, a casino operator might have to replace expensive player tracking units in all of its gaming machines to enable communications with the new player tracking server. When player tracking server. When completed, only one model of many would have the enhanced capability and the same effort would need to be repeated for many various models of player tracking units.

Another advantage of gaming machine communication techniques described herein is improved data transmission speeds. Network gaming services, which require communicating ever larger amounts of information, are becoming increasingly important in the gaming industry. The limited communication capabilities of current systems make it difficult for a gaming machine operator to upgrade gaming machine functions and services.

Although the foregoing invention has been described in some detail for purposes of clarity of understanding, it will be apparent that certain changes and modifications may be practiced within the scope of the appended claims. For instance, while the gaming machines of this invention have been depicted as upright models having top box mounted on top of the main gaming machine cabinet, the use of gaming devices in accordance with this invention is not so limited. However, gaming machines may also be provided without a top box or the gaming machine may be of a slant-top or table top design. Alternately, some of the network hardware used for each gaming service may require the use of additional hardware within the gaming machine. For example, for player tracking services, an interface board is usually provided within the gaming machine that is connected to the player tracking network hardware. The interface board may use a particular proprietary communication protocol to communicate with the player tracking server. There are many different manufacturers of player tracking interface boards and the type of proprietary communication protocol used on each interface board varies from manufacturer to manufacturer. Also, a fiber optic network is often used to provide a connection to the progressive network. Thus, a dedicated fiber optic communication interface may be provided in each gaming machine.

What is claimed is:

1. A communication interface comprising:
   one or more memory devices, the one or more memory devices being configured to store a plurality of communication protocols including at least a common network communication protocol, a first non-network communication protocol, and a second non-network communication protocol, each of the common network communication protocol, the first non-network communication protocol, and the second non-network communication protocol being different from one another;
   one or more processors, the one or more processors being configured to unpackage, translate, and package communications in one or more of the common network communication protocol, the first non-network communication protocol, and the second non-network communication protocol; and
   a plurality of communication ports, each communication port being configured to couple the communication interface to a node in a gaming network, each communication port being configured to enable communication with the corresponding node via a connection when the communication port is communicatively coupled to the node with the connection, the plurality of communication ports including:
      one or more common network communication ports, each common network communication port being configured to enable communication with a node connected thereto according to the common network communication protocol;
      one or more first communication ports, each first communication port being configured to enable communication with a node connected thereto according to the first communication protocol; and
      one or more second communication ports, each second communication port being configured to enable communication with a node connected thereto according to a second communication protocol.

2. The communication interface of claim 1 wherein the first non-network communication protocol is a first proprietary communication protocol.

3. The communication interface of claim 2 wherein the second non-network communication protocol is a second proprietary communication protocol that is different from the first proprietary communication protocol.

4. The communication interface of claim 1 wherein one or more of the common network communication ports communicate data with a gaming machine server that provides at least one game service in the first non-network communication protocol.

5. The communication interface of claim 4 wherein the at least one game service is selected from the group consisting of progressive game services, bonus game services, player tracking services, cashless/ticketing services, game downloading services, prize services, entertainment content services, concierge services, lottery services and money transfer services.

6. The communication interface of claim 1 wherein the common network communication protocol is selected from the group consisting of a TCP/IP communication protocol, a SLIP communication protocol, and a PPP communication protocol.

7. The communication interface of claim 1 wherein the first non-network communication protocol is selected from the group consisting of a progressive game service protocol, a bonus game service protocol, a player tracking service protocol, a cashless/ticketing service protocol, a game downloading service protocol, a prize service protocol, an entertainment content service protocol, a concierge service protocol, a lottery service protocol and a money transfer service protocol.

8. The communication interface of claim 1 wherein the communication interface is included in a player tracking unit.

9. The communication interface of claim 1 wherein one or more of the first communication ports are connected to a node that is a gaming machine, and wherein the gaming machine employs proprietary gaming software that provides data in the first non-network communication protocol to one or more of the first non-network communication ports.

10. The communication interface of claim 9 wherein the proprietary gaming software is not configured to read messages transmitted in the second non-network communication protocol or the common network communication protocol.

11. The communication interface of claim 1 wherein the communication interface is assigned an IP address.

12. The communication interface of claim 1 wherein a physical interface of one or more of the first or second non-network communication ports is selected from the group consisting of RS-422/485, Fiber Optic, RS-232, DCS Current Loop, Link Progressive Current Loop, FireWire, Wireless, Ethernet and USB.

13. The communication interface of claim 1, wherein the one or more processors are configured to unpackage communications received in the common network communication protocol and to translate and repackage these unpackaged communications into the first non-network communication protocol or the second non-network communication protocol.

14. The communication interface of claim 13, wherein the one or more processors are further configured to, in response to receiving a communication in the common network communication protocol, determine a communication port from the one or more first non-network communication ports or the one or more second non-network communication ports to which to send the repackaged communication.

15. The communication interface of claim 14, wherein:
when a communication in the common network communication protocol is received by the communication interface and determined by the one or more processors to be targeted to a node that is configured to communicate according to the first communication protocol, the one or more processors are configured to:
unpackage the communication;
translate the communication from the common network protocol to the first non-network communication protocol;
repackage the communication in the first non-network communication protocol; and
communicate the repackaged communication in the first non-network communication protocol via the determined one of the first communication ports to the node; and
when a communication in the common network communication protocol is received by the communication interface and determined by the one or more processors to be targeted to a node that is configured to communicate according to the second communication protocol, the one or more processors are configured to:
unpackage the communication;
translate the communication from the common network protocol to the second non-network communication protocol;
repackage the communication in the second non-network communication protocol; and
communicate the repackaged communication in the second non-network communication protocol via the determined one of the second communication ports to the node.

16. The communication interface of claim 1, wherein the one or more processors are configured to unpackage communications received in either the first non-network communication protocol or the second non-network communication protocol and to translate and repackage these unpackaged communications into the common network communication protocol.

17. The communication interface of claim 16, wherein the one or more processors are further configured to, in response to receiving a communication in the first non-network communication protocol or the second non-network communication protocol, determine a communication port from the one or more common network communication ports to which to send the repackaged communication.

18. The communication interface of claim 17, wherein:
when a communication in the first non-network communication protocol is received by the communication interface and determined to be sent over the gaming network, the one or more processors are configured to:
unpackage the communication;
translate the communication from the first non-network communication protocol to the common network protocol;
repackage the communication in the common network communication protocol; and
communicate the repackaged communication in the common network communication protocol through the determined one of the common network communication ports; and
when a communication in the second non-network communication protocol is received by the communication interface and determined to be sent over the gaming network, the one or more processors are configured to:
unpackage the communication;
translate the communication from the second non-network communication protocol to the common network protocol;
repackage the communication in the common network communication protocol; and
communicate the repackaged communication in the common network communication protocol through the determined one of the common network communication ports.

19. The communication interface of claim 1, wherein the one or more processors are configured to unpackage, translate, and repackage communications that are encrypted without first decrypting the encrypted communications.

20. The communication interface of claim 1, wherein the one or more processors are further configured to encrypt translated communications to be sent in the common network protocol, the first non-network protocol, or the second non-network protocol.

* * * * *

UNITED STATES PATENT AND TRADEMARK OFFICE
CERTIFICATE OF CORRECTION

| | | |
|---|---|---|
| PATENT NO. | : 8,454,440 B2 | Page 1 of 1 |
| APPLICATION NO. | : 12/283382 | |
| DATED | : June 4, 2013 | |
| INVENTOR(S) | : Brosnan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1213 days.

Signed and Sealed this
Twenty-third Day of December, 2014

Michelle K. Lee
*Deputy Director of the United States Patent and Trademark Office*